United States Patent [19]

Mueller et al.

[11] Patent Number: 4,510,575

[45] Date of Patent: Apr. 9, 1985

[54] METHOD FOR WRITING HOLOGRAMS

[75] Inventors: Peter F. Mueller, Concord; H. John Caulfield, Nagog Woods, both of Mass.

[73] Assignee: Aerodyne Research, Inc., Billerica, Mass.

[21] Appl. No.: 410,901

[22] Filed: Aug. 24, 1982

[51] Int. Cl.³ .................. G06F 15/46; G03H 1/22
[52] U.S. Cl. .................... 364/518; 364/525; 350/3.6; 350/3.75
[58] Field of Search .......... 364/521, 518, 524, 525, 364/488–491; 350/3.83, 3.84, 3.6, 3.75, 3.74

[56] References Cited

U.S. PATENT DOCUMENTS

| | | | |
|---|---|---|---|
| 3,832,027 | 8/1974 | King | 350/3.84 X |
| 3,890,035 | 6/1975 | Takeda | 350/3.74 X |
| 4,125,314 | 11/1978 | Haskell et al. | 350/3.6 |
| 4,164,788 | 8/1979 | Jain | 364/525 X |
| 4,259,724 | 3/1981 | Sugiyama | 364/491 |
| 4,342,090 | 7/1982 | Caccoma et al. | 364/491 |
| 4,343,874 | 8/1982 | Haines | 350/3.83 X |
| 4,360,885 | 11/1982 | Edgar | 364/525 |
| 4,405,989 | 9/1983 | Tsukada et al. | 364/525 |
| 4,412,296 | 10/1983 | Taylor | 364/521 |
| 4,433,384 | 2/1984 | Berrian et al. | 364/525 |
| 4,455,061 | 6/1984 | Case | 350/3.75 |

*Primary Examiner*—Edward J. Wise
*Attorney, Agent, or Firm*—Frank A. Steinhilper

[57] ABSTRACT

A micro graphic representation such as a hologram is formed by directing from a computer to a display surface signals to form a very small portion of the graphic representation of the display surface, focusing a micro image of the display on a recording element, mechanically moving the recording element to a new position, optically measuring the new position and signalling the computer the precise new position and then sending to the display surface next signals to form on the display surface a next very small portion of the graphic representation with the position of the next portion modified to compensate for the difference between the measured position and the required position. The piece-by-piece display is repeated a large number of times to record an entire graphic representation. One embodiment of the invention is a hologram writer.

2 Claims, 2 Drawing Figures

METHOD FOR WRITING HOLOGRAMS

BACKGROUND OF THE INVENTION

In various fields of graphics such as the production of moire grids, reticle and the like it is necessary to form precise patterns where it is necessary that the pattern be of like and uniform dimensions and tolerances throughout the graphic representations and that the geometric position or phase position of all the portions of the pattern be precise. Specifically in these graphics it is necessary that the position and dimensions at one corner of the graphic representation be precisely in phase with the position of other portions at other corners or near the center of the graphic representation and that the dimensions throughout be accurate within extremely close tolerances.

One field of use where the geometric identity is extremely demanding and the demands are well known in the art is in hologram production. A hologram is essentially a pattern of fringes which must be in phase with each other throughout the hologram. The fringes in various parts of the hologram must be equal, and the spacing from center to center of the fringes must be accurate. Inaccuracies of dimension or phase from one point to another will result in a fuzzy recreation of the object represented in the hologram.

Where graphic representations are required in micro size, as they are for example in holography, it is usual to for such patterns in large scale or macro representation and reduce them optically for recording to produce the micro graphic. Unfortunately, optics for such micro reduction characteristically may not produce accurate geometric positioning, design and dimension throughout a large broad area, and distortion is ordinarily expected, particularly in positions close to the perimeter of the graphic representation in reference to positions closer to the center or opposite side of the perimeter.

GENERAL NATURE OF THE INVENTION

The present invention produces or writes a graphic representation such as a hologram, a moire grid or the like by dividing the total representation into a large multiplicity of parts or cells and presents each micro part or cell for recording in virtually perpendicular projection in all areas, avoiding peripheral distortion of dimension or design. A large or macro sized image of a cell unit is formed, preferably on a fine resolution cathode ray tube or other display device or surface and this image is projected on and focused on a recording medium such a halographic plate in suitable size, ordinarily by a microscope or other small optical device. The position of the image surface and recording medium with respect to each other and with respect to the microscope is then adjusted for the next cell unit, for example by mechanically moving the recording medium, the relative position precisely determined or adjusted for, again, essentially perpendicular projection onto the precise position, and this new cell is recorded. Stepwise, the multitudinous cells are individually projected with precise positional adjustment for each projection until the entire graphic representation is recorded.

In the preferred embodiment of the invention a computer-generated hologram is written on fine resolution photographic plate. A cathode ray tube or other electronic display device is positioned with its image display surface directly above a plate. A microscope focuses the image of a cell from the tube face to the plate, and the relative position of plate and tube face is optically determined. After exposure of a first cell, the position is moved, for example by mechanically moving the plate to essentially the correct new position for a subsequent cell, the new position optically determined, and the next cell presented on the display surface with positional compensation for error between desired and actual mechanical position of the plate, thus presenting the subsequent cell again essentially perpendicularly and in precise position. After each movement of the plate, the true new position in the x and y directions is determined by interferometers and this positional information is relayed by the computer to the cathode ray tube for image positional compensation of the next cell image sent by the computer to the cathode ray tube. Interferometric determination of plate position and compensation of positional information by computer to cathode ray tube produces positional accuracy in the order of 0.1 micron on the plate or even closer tolerance. If needed, compensation in the form of focus adjustment may be employed in operation, and change of size of enlargement to correct for small variations in size may also be made.

In a system of such requirements for precision, thermal change may produce serious distortion, and the entire apparatus and supporting structure are selected for minimal thermal expansion. In addition, in this system as in holography, vibration must be minimized. When mechanical motion, for example in movement of plate relative to image, vibration is to be absorbed and a settling time of several hundred milliseconds is generally allowed between the mechanical movement and the imaging and recording, this despite the fact that the system is solidly mounted as on a large, cushioned granite table.

The general nature of the invention having been set forth, the invention may be more fully understood in connection with the drawings, in which.

SPECIFIC DESCRIPTION OF THE INVENTION

Figure 1:
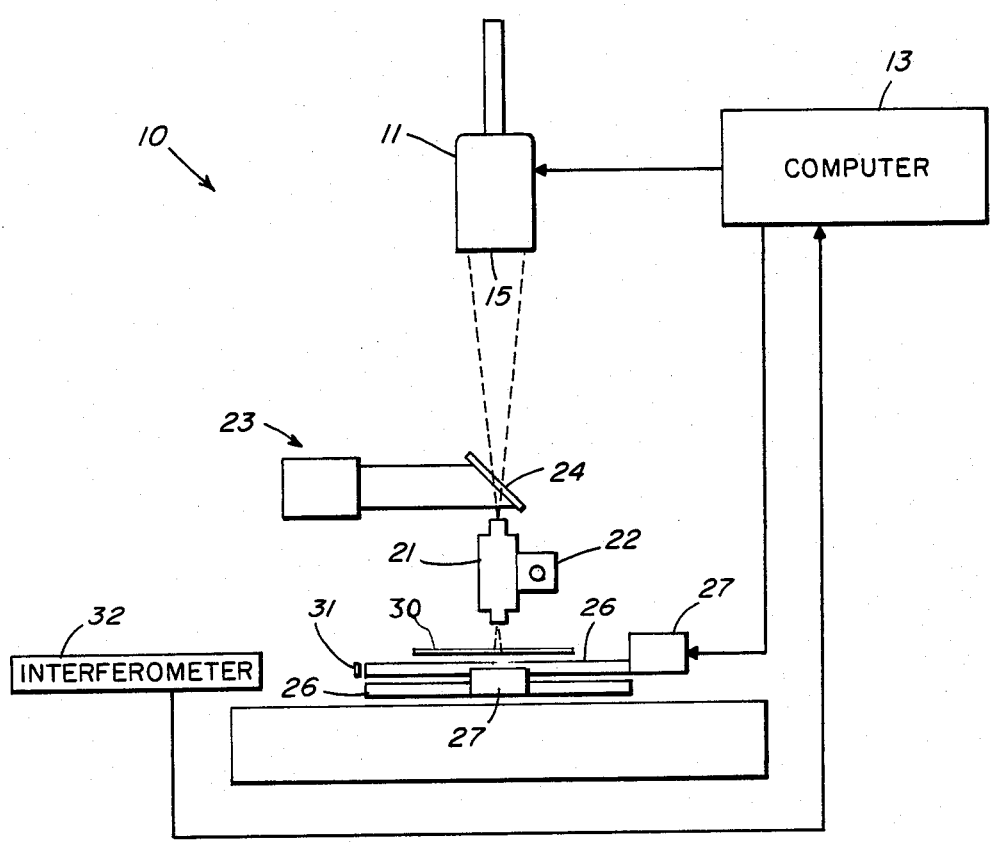
FIG. 1 is a diagrammatic view of a system for hologram writing according to one embodiment of the invention.
Figure 2:
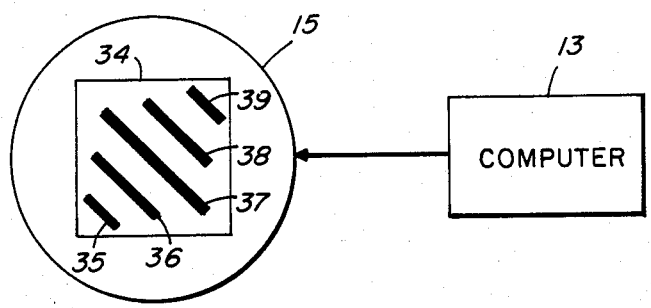
FIG. 2 is a diagrammatic view of an image-bearing display surface according to the embodiment of FIG. 1.

FIG. 1 shows a printer generally designated 10 having a cathode ray tube 11 with a tube face 15 on which a desired image is displayed. This image may be hologram fringes (as shown in FIG. 2) or may be other graphic representation images as desired. A computer 13 directs input information to conventional electronic controls for the cathode ray tube (controls not shown), and to other parts of the printer as will be shown hereinafter. The tube face 15 is focused through a microscope 21 to a display or recording location beneath the microscope. Positioned on a large granite block or table 25 is image receiving and recording means such as a fine resolution photographic plate 30 which is of the sort conventionally used in holography. Mounted on table 25 are two slides 26, each with a drive motor 27. The upper slide is mounted on the lower slide, with motors 27 adapted to move the slides controlled small distances in the "x" and "y" directions. In practice, the slides and motors are commercially available in preassembled units. The two slide-motor assemblies are mounted in cross direction to give either "x" or "y" direction or both direction motion to a plate or other recording member on the slide assemblies. A mirror 31 is securely mounted on the end of each slide 26 (mirror 31 on upper slide being shown). An interferometer 32 is mounted on or near the table 25, one interferometer facing each mirror 31.

A computer 13 is mounted on or near table 25 as a control center for the printer 10. The computer 13 is preprogrammed with information for printing the desired graphic representation, in this case a hologram. This information is fed to the controls for the cathode ray tube 11 as previously shown. The computer 13 also receives signals from interferometers 23 identifying the x and y position of slides 26. The computer 13 also directs control signals to motors 27 for applying mechanical motion to slides 26.

The cathode ray tube 11 is a fine resolution tube having low distortion. One such tube, the tube in actual operation on a device, is available from Infodex, Inc. Waterbury, Conn. as Model PD-1200 M 34. Computer 13 directs image information to the tube controls to form an image as shown in FIG. 2 for projection to film 30. FIG. 2 shows the computer 13 directing information to a cathode ray tube whose face 15 is shown. On the tube face 15 is an image area 34 (not marked on the actual tube, but illustrated in FIG. 2). Within the image area 34 are a plurality of bright areas or segments of hologram fringes 35, 36, 37, 38, and 39, representing a segment of a large hologram of fringes. The image in image area 34 on tube face 15 is in large or macro size and, as will be described hereinafter, will be displayed on tube face 15 one unit or cell at a time, for a large multiplicity of cells for recording in micro size on the plate 30. In one embodiment of the invention the printer 10 is a hologram writer, printing onto a 70 mm format 30 an entire hologram in the form of individual cells about 0.2 mm. square with, accordingly about 350 rows of 350 cells in each row.

Positioned between the cathode ray tube 11 and microscope 21 in the printer 10 of FIG. 1 is a mirror assembly 23 having a partly silvered mirror 24 inclined at an angle to the direction of the light of the image from tube face 15. This mirror assembly permits visual monitoring of the image focused onto film 30 and may, if desired be a mirror assembly of a sort to provide automatic focus control. Such automatic focus assemblies are available commercially. The mirror assembly illustrated diagrammatically in FIG. 1 is a removable mirror assembly, positionable as shown. Microscope 21 has a focus control 22, permitting the image from tube face 15 to be focused on plate 30 while monitored by mirror assembly 23. Focus control 22 may be conventional manual control.

As described hereinbefore, table 25 is a large heavy support piece such as a large granite block. This table desirably is mounted on pneumatic supports (not shown) and is adapted to absorb random ambient vibration. It also has a high heat capacity and reduces temperature fluctuation of the apparatus comprising printer 10. Desirably, the entire apparatus is housed in a room of controlled temperature and humidity, and in such environment the heavy granite table assists in maintaining uniform temperature.

As described hereinbefore, mounted on table 25 are two slide-motor assemblies 26–27, being mounted to provide separate movement control in the x direction and in the y direction. Suitable assemblies are available from Klinger Scientific Corporation, Richmond Hill, N.Y. as Klinger Scientific Model MT-160.

As described hereinbefore, interferometers 32 are positioned to monitor the position of slides 26, one interferometer in the x direction and the other in the y direction. An interferometer now in use on apparatus according to the invention is available from Hewlett Packard Co., as Laser Interferometer System Model 5501. Such interferometer determination of the position of slides 26 can determine the position of the slide to about a tolerance of 0.001 mm or less.

In use and operation, a plate 30 is mounted on slide 26 and moved to a position to place a selected, desired area of the plate under microscope 21. If desired, the microscope is focused and checked with mirror 24, and the mirror assembly may be removed. Interferometers 32 signal to computer 13 the x and y position of plate 30 with respect to the projected location of image area 34 which is the desired cell position. At this time there is displayed on the cathode tube face 15 a single portion or cell of an entire graphic representation such as hologram fringe segments 35 to 39 of FIG. 2. This macro cell on tube face 15 is thus focused on film 30 as a micro image. After exposure of the first cell, slides 26 are moved by pulsing motors 27 to move plate 30 approximately one cell's distance. This mechanical motion sets up initial vibration, and after a settling period the x and y positions are signaled to the computer 13 by interferometers 32. For the accuracy required for hologram writing, the settling time is in the range of about one or two hundred milliseconds. The computer then sends to the cathode ray tube 11 the signals for the next cell corresponding to the new x and y positions, with compensation for the actual x and y readings by the interferometers. Referring to FIG. 2, the position of the cell or fringes within image area 34 is moved within the image area to compensate for such interferometer-determined positions. In consequence, the second and subsequent cell positions on plate 30 are precisely oriented with respect to the first cell position and with respect to each prior cell position in the graphic representation on plate 30.

EXAMPLE 1

A computer-generated hologram was written in the graphic representation printer illustrated in FIGS. 1 and 2. A test image was displayed on cathode ray tube face 15 and focus checked. The mirror assembly 23 was then removed. A 4×5 inch plate secured to slide 26 was then exposed to a first hologram cell in the form of a cell image sent to the cathode ray tube 11 by computer 13. After exposure, the computer pulsed motors 26 to send slides 26 to a next cell position. After a settling time of about 170 microseconds the interferometers 32 signaled to computer 13 the actual x and y positions of plate 30 and the computer signaled to the cathode ray tube 11 a next cell image with compensation for the actual film position. After this second exposure, the computer again moved slides 26 stepwise through subsequent cell exposures for 350 rows of 350 cell in each row. The entire hologram was printed in about 11.6 hours.

In this example, size of the cell image on the face of the cathode ray tube was held constant, but size change to cause the cell projection on the plate to completely fill and not overflow the allotted cell space is made by adjusting the computer signal to the cathode ray tube. With the particular model cathode ray tube employed, about ten percent increase or decrease in cell size can be obtained.

We claim:

1. A method of forming a hologram comprising
storing in a computer a program corresponding to a hologram to be produced in precise geometric arrangement throughout said hologram,
forming on an electronic display surface in response to signals from said computer corresponding to said stored program a first portion of said pattern and optically projecting said first portion in micro size to a precisely positioned portion of a photoreceptor,
mechanically moving said photoreceptor with respect to said electronic display surface essentially the required pattern distance for the projection of a next portion of said pattern and optically sensing the distance of the mechanical motion,
forming on said electronic display surface a next portion of said pattern while compensating in the position on said electronic display surface for the difference between the sensed portion of said photoreceptor and the required position of said receptor, and
repeatedly repeating a large multiplicity of times the steps of mechanically moving said photoreceptor, sensing the distance of motion, forming a next image on said display surface and compensating for the difference between sensed position and required position to form an entire hologram having constant geometric characteristics throughout the hologram.

2. A method of hologram writing comprising programming to a computer system information corresponding to hologram fringes, separating the program into a large multiplicity of cell portions corresponding to a large multiplicity of hologram segments, directing from the computer to a cathode ray tube control signals sequentially for each of said individual cell portions, focusing from said cathode ray tube to a fine resolution photographic plate each of separate images of said cell portions in micro size, and moving said film between each successive cell portion to present for each cell portion a new corresponding plate area so that each cell portion is precisely positioned on said plate at the location for said cell portion in the hologram.

* * * * *